United States Patent
Hahn et al.

(10) Patent No.: US 11,153,764 B2
(45) Date of Patent: Oct. 19, 2021

(54) DETERMINE CHANNEL PLANS

(71) Applicant: Hewlett Packard Enterprise Development LP, Houston, TX (US)

(72) Inventors: Dongwoon Hahn, San Jose, CA (US); Mathieu Mercier, Laval (CA); Sachin Ganu, San Jose, CA (US); Nethra Muniyappa, Santa Clara, CA (US); Sree Harsha, Santa Clara, CA (US); Rajini Balay, Santa Clara, CA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 0 days.

(21) Appl. No.: 16/591,830

(22) Filed: Oct. 3, 2019

(65) Prior Publication Data

US 2020/0037172 A1    Jan. 30, 2020

Related U.S. Application Data

(63) Continuation of application No. 15/796,747, filed on Oct. 27, 2017, now Pat. No. 10,477,412.

(51) Int. Cl.
*H04W 16/18* (2009.01)
*H04W 72/10* (2009.01)
*H04W 84/12* (2009.01)
*H04W 88/08* (2009.01)

(52) U.S. Cl.
CPC ........... *H04W 16/18* (2013.01); *H04W 72/10* (2013.01); *H04W 84/12* (2013.01); *H04W 88/08* (2013.01)

(58) Field of Classification Search
CPC ..... H04W 16/18; H04W 72/10; H04W 84/12; H04W 88/08
See application file for complete search history.

(56) References Cited

U.S. PATENT DOCUMENTS

| | | | |
|---|---|---|---|
| 5,697,059 A | 12/1997 | Carney | |
| 5,943,340 A * | 8/1999 | Iemura | H04W 72/082 370/329 |
| 6,023,622 A | 2/2000 | Plaschke et al. | |

(Continued)

FOREIGN PATENT DOCUMENTS

| | | |
|---|---|---|
| CN | 101115273 A | 1/2008 |
| CN | 101422005 A | 4/2009 |
| EP | 1760966 A2 | 3/2007 |

OTHER PUBLICATIONS

European Search Report and Search Opinion Received for EP Application No. 18196484.2, dated Dec. 20, 2018, 14 pages.

(Continued)

*Primary Examiner* — Dinh Nguyen
(74) *Attorney, Agent, or Firm* — Brooks, Cameron & Huebsch, PLLC (57) ABSTRACT

An example non-transitory computer readable medium comprising instructions executable by a processor to: determine a channel distribution vector based on a channel priority for a plurality of available wireless channels within a wireless network; receive a set of constraints on a channel plan; determine a channel plan meeting the set of user defined constraints based on the channel distribution vector; and transmit the channel plan to a plurality of radios on the wireless network, wherein the channel plan comprises a channel assigned to each radio of the plurality of radios.

10 Claims, 4 Drawing Sheets

(56) References Cited

U.S. PATENT DOCUMENTS

| | | | |
|---|---|---|---|
| 6,047,187 A | | 4/2000 | Haartsen |
| 6,137,991 A | * | 10/2000 | Isaksson ............... H04W 16/18 |
| | | | 455/513 |
| 6,175,734 B1 | * | 1/2001 | Desgagne ............ H04W 16/18 |
| | | | 455/424 |
| 6,788,943 B1 | | 9/2004 | Haemaelaeinen et al. |
| 9,326,294 B2 | | 4/2016 | Tang et al. |
| 2003/0013480 A1 | * | 1/2003 | Endo ........................ H04B 1/38 |
| | | | 455/552.1 |
| 2003/0050067 A1 | * | 3/2003 | Rozmaryn ............ H04W 16/18 |
| | | | 455/447 |
| 2003/0086437 A1 | | 5/2003 | Benveniste |
| 2004/0203814 A1 | | 10/2004 | Ho et al. |
| 2004/0266430 A1 | | 12/2004 | Fudim et al. |
| 2006/0236226 A1 | | 10/2006 | Meijer et al. |
| 2009/0215399 A1 | * | 8/2009 | Majonen ............. H04L 25/0248 |
| | | | 455/67.11 |
| 2010/0238871 A1 | | 9/2010 | Tosic et al. |
| 2012/0294246 A1 | | 11/2012 | Cariou et al. |
| 2015/0029959 A1 | | 1/2015 | Da et al. |
| 2016/0037542 A1 | | 2/2016 | Tang et al. |
| 2017/0034707 A1 | | 2/2017 | Green et al. |
| 2018/0027552 A1 | | 1/2018 | Jeong et al. |
| 2018/0295528 A1 | * | 10/2018 | Anantha ................. H04L 43/16 |

OTHER PUBLICATIONS

European Search Report and Search Opinion Received for EP Application No. 18196484.2, dated Mar. 21, 2019, 12 pages.
Katzela, I. et al., Channel Assignment Schemes for Cellular Mobile Telecommunication Systems: a Comprehensive Survey, (Research Paper), Jun. 1996, 22 Pgs.

* cited by examiner

DETERMINE CHANNEL PLANS

CROSS-REFERENCE TO RELATED APPLICATIONS

This application is a continuation of U.S. patent application Ser. No. 15/796,747, filed on Oct. 27, 2017, the entire contents of which is incorporated by reference herein. The Applicant hereby rescinds any disclaimer of claim scope in the parent application or the prosecution history thereof and advises the USPTO that the claims in this application may be broader than any claim in the parent application(s).

BACKGROUND

Within a wireless network environment, radios may be assigned a frequency resource, or operating channel. The radios may be assigned an operating channel according a channel plan. A channel plan may be determined for all radios within a wireless network environment by a central controller.

DETAILED DESCRIPTION

Access points (APs) may be used to provide devices access to a network. As used herein, an AP can refer to a networking device that allows a client device to connect to a wired or wireless network. The term AP can, for example, refer to receiving points for any known or convenient wireless access technology which may later become known. Specifically, the term AP is not intended to be limited to IEEE 802.11-based APs. APs generally function as an electronic device that is adapted to allow wireless devices to connect to a wired network via various communication standards. An AP can include a processing resource, memory, and/or input/output interfaces, including wired network interfaces such as IEEE 802.3 Ethernet interfaces, as well as wireless network interfaces such as IEEE 802.11 Wi-Fi interfaces, although examples of the disclosure are not limited to such interfaces. An AP can include a memory resource, including read-write memory, and a hierarchy of persistent memory such as ROM, EPROM, and Flash memory.

An AP may provide access to a wireless network, such as a Wireless Local Area Network (WLAN). As used herein, a WLAN can, for example, refer to a communications network that links two or more devices using some wireless distribution method (for example, spread-spectrum or orthogonal frequency-division multiplexing radio), and usually providing a connection through an AP to the Internet: and thus, providing users with the mobility to move around within a local coverage area and still stay connected to the network.

An AP may include one or a plurality of radios. As used herein, a radio refers to hardware on an AP to receive signals and transmit the received signals to other components within the AP. The radio of an AP may receive signals from within the WLAN, such as wireless signals, or the radio may receive external signals, such as from sources outside the WLAN.

Each AP within a WLAN may have the capability to operate on one, or more than one, channel. As used herein, a channel refers to a particular path through which signals and communications are able to move. A channel may operate within a particular frequency and may have a capacity to handle a particular amount of information over a particular period of time (for example, a channel may be able to transmit 1 gigabyte of data per second, although examples are not so limited). A channel on which a particular AP is able to operate may be referred to as a feasible channel for the AP. In some examples, a radio of the AP may be operating on the channel.

A network, such as a WLAN, may have a channel plan. As used herein, a channel plan refers to a disposition of access points among various operating channels. As described above, each access point within a network may have the capability to operate on one or more channels. A channel plan may therefore assign each of the access points within the network to a particular operating channel. A channel plan may be computed by a controller within the network. As used herein, a controller refers to an interface between two devices. In some examples, a controller may be an interface between a peripheral device and a computing system, although examples are not so limited. A controller may further manage a connection between a device, such as an access point, and a network, or between a plurality of radios or APs within the network.

A particular channel plan may be selected for a network from a plurality of channel plans. The particular channel plan may be selected based on consideration of a plurality of cost metrics. As used herein, a cost metric refers to a measure of a characteristic of a network and/or a channel plan. For example, an amount of interference may be one cost metric. As used herein, interference refers to any undesired energy within a system that interferes with reception and/or emission of signals. One form of interference is noise. As used herein, noise refers to interference that is able to occur on any channel and/or frequency. In some examples, noise may occur in response to an amount of traffic occurring on a channel. For example, noise may occur in response to a large amount of activity from client devices on a particular access point or particular channel.

A second form of interference is radar. As used herein, radar refers to a type of interference to occur on a dynamic frequency switching (DFS) channel. A DFS channel refers to a channel that is able to experience radar interference events. A non-DFS channel, by contrast, may be unable to experience radar interference.

Another cost metric may be distribution of channels. Distribution of channels refers to a number of radios, or APs, assigned to a particular channel. For example, a network may have ten wireless nodes and eleven available channels. A channel distribution for the network may indicate how many of the ten wireless nodes are assigned to each of the available channels. For instance, the channels may be distributed as follows: three nodes assigned to channel one, three nodes assigned to channel six, four nodes assigned to channel eleven, and no nodes assigned to the remaining channels.

Disruption may be another cost metric to consider. A disruption cost metric may refer to an amount of disruption that would be experienced when changing a radio from operating on one channel to operating on another channel. In some examples, disruption may be related to interference. Disruption may be determined to be high when changing a radio from operating on one channel to operating on a second channel is likely to cause a great amount of interference, while disruption may be determined to be low when a low amount of interference may be experienced when changing a radio's operations between two channels.

Interference, distribution of channels, and disruption may be considered as cost metrics; however, examples are not so limited, and other cost metrics may be considered. Additional cost metrics may be considered based on particular usage goals of the network. In some examples, the cost metrics of each channel plan of a plurality of channel plans may be optimized based on the usage goals of the network. As used herein, optimization refers to the process of determining what use of a particular resource best meets particular goals for a system. Within a network, such as a WLAN, optimization may include determining the usage goals of the network and computing which channel plan of a plurality of channel plans meets or exceeds the usage goals of the network.

Channel plan adjustments may aid in promoting efficient usage of a network and its resources. However, channel plan adjustments may involve time-consuming computations and comparison, as each channel plan of a plurality of channel plans may be considered separately. While adjusting each channel plan of a plurality of channel plans individually may result in a determination of a fit channel plan for the usage goals of a network, the computation time to make this determination may hinder the network and expend additional network resources. Moreover, networks may regularly re-compute channel plans; thus, re-adjustment may occur regularly. This may compound the amount of time spent on computing better channel plans and reduce the amount of time a network is able to implement the channel plan.

Channel plan determination according to the present disclosure may reduce an amount of time to compute an adjustment of a channel plan. In some examples, channel plan determination according to the present disclosure may be performed in multiple stages. A channel distribution vector may be determined for a plurality of available wireless channels within a wireless network. A set of constraints on a channel plan may further be received. Based on the set of constraints and the channel distribution vector, a channel plan may be determined. In some examples, the determined channel plan may be based on the channel distribution vector and may be determined so as to meet the set of constraints. The determined channel plan may then be transmitted to the wireless network, where it may be implemented on a plurality of radios of the network.

Figure 1:
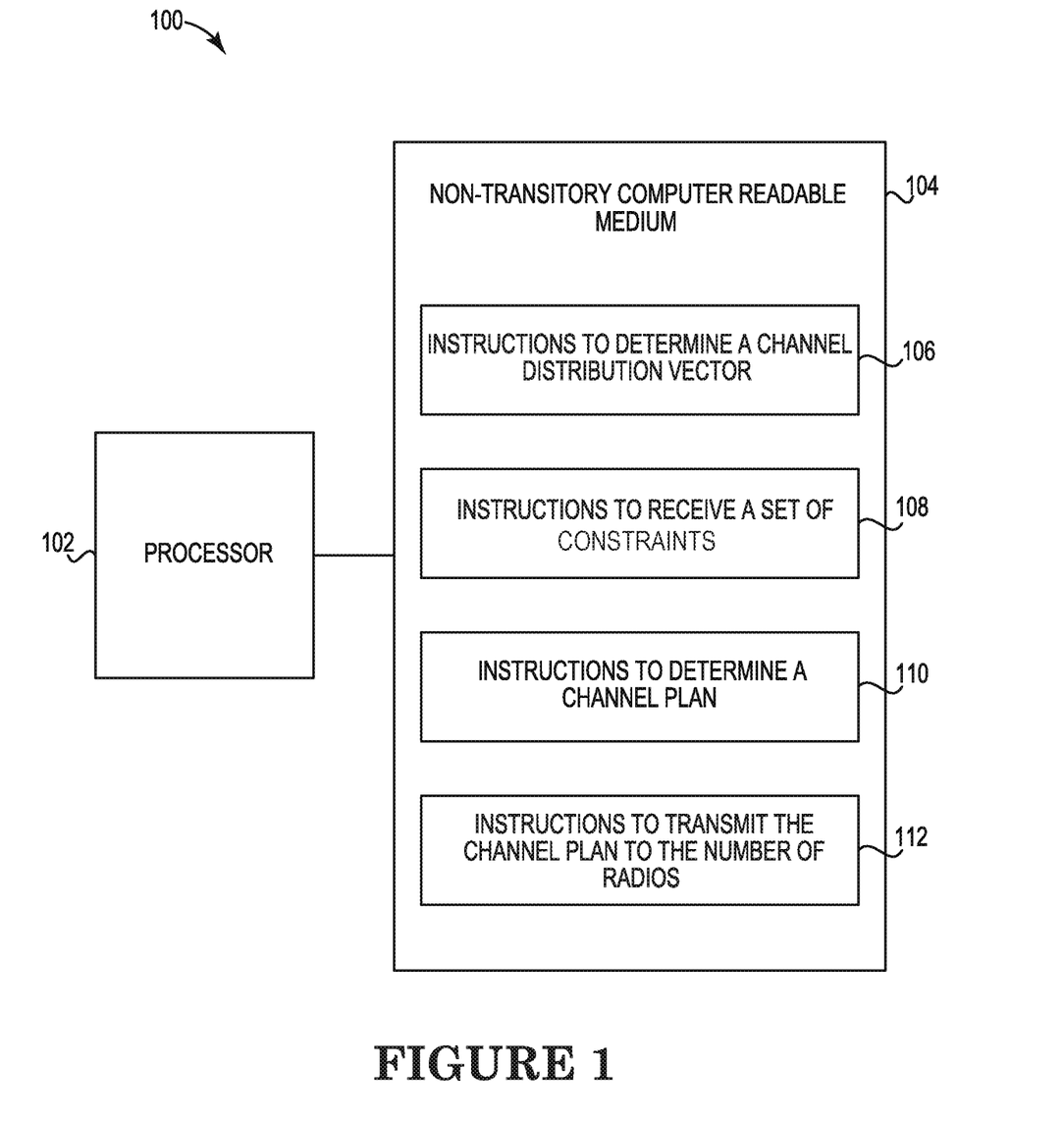
FIG. 1 is an example system to determine channel plans consistent with the present disclosure.

FIG. 1 is an example system 100 for channel plan determination consistent with the present disclosure. System 100 may include processor 102. System 100 may further include a non-transitory computer readable medium 104 on which may be stored instructions, such as instructions 106, 108, 110, and 112. Although the following descriptions refer to a single processor and a single non-transitory computer readable medium, the descriptions may also apply to a system with multiple processors and multiple non-transitory computer readable media. In such examples, the instructions may be distributed (e.g., stored) across multiple non-transitory computer readable media and the instructions may be distributed (e.g., executed by) across multiple processors.

Processor 102 may be a central processing unit (CPU), a semiconductor based microprocessor, and/or other hardware devices suitable for retrieval and execution of instructions stored in non-transitory computer readable medium 104. Processor 102 may fetch, decode, and execute instructions 106, 108, 110, 112, or a combination thereof. As an alternative or in addition to retrieving and executing instructions, processor 102 may include at least one electronic circuit that includes electronic components for performing the functionality of instructions 106, 108, 110, 112, or a combination thereof.

Non-transitory computer readable medium 104 may be an electronic, magnetic, optical, or other physical storage device that stores executable instructions. Thus non-transitory computer readable medium 104 may be, for example, Random Access Memory (RAM), an Electrically-Erasable Programmable Read-Only Memory (EEPROM), a storage drive, an optical disc, and the like. Non-transitory computer readable medium 104 may be disposed within system 100, as shown in FIG. 1. In this example, the executable instructions may be "installed" on the system. Additionally and/or alternatively, non-transitory computer readable medium 104 may be a portable, external or remote storage medium, for example, that allows system 100 to download the instructions from the portable/external/remote storage medium. In this situation, the executable instructions may be part of an "installation package". As described herein, non-transitory computer readable medium 104 may be encoded with executable instructions for channel plan determination.

Instructions 106, when executed by a processor such as processor 102, may include instructions to determine a channel distribution vector. As used herein, a channel distribution vector refers to a vector representing a distribution of wireless channels. In some examples, a channel distribution vector may comprise a histogram representing a number of radios on each of the available wireless channels in the network. That is, a channel distribution vector may correspond to a number of radios using each of the available wireless channels on the wireless network.

In some examples, the channel distribution vector may be based on a channel priority for a plurality of available wireless channels. As used herein a channel priority refers to an order by which the channel is to be assigned. A channel priority may be based on, for example, the network in which the channel is operating, as well as past interference events experienced by the channel. A channel which has experienced a greater number of interference events may receive a lower priority, while a channel with a smaller number of interference events may receive a higher priority.

An initial channel priority may be assigned by a user of the network. A user may assign an initial channel priority based on, for example, interference events experienced by each channel of the wireless network, although examples are not so limited. In some examples, instructions 106 may include instructions to determine a channel priority based on a characteristic of a radio environment. The characteristic may comprise a number of client devices capable of using DFS channels. As described previously, a DFS channel is a channel that is able to experience a radar event. A client device may be able to utilize, or operate on, DFS channels, and may therefore be able to receive radar interference.

In some examples, a channel priority may be adjusted. Instructions 106 may include instructions executable to detect a radar event on a particular channel of the wireless network. As described previously, a radar event refers to a particular type of interference event occurring on a DFS channel. Upon detection of a radar event, instructions 106 may further include instructions to adjust a priority of the particular channel. In some examples, the priority of the particular channel may be adjusted based on the detected radar event. For instance, a particular channel may have a priority decreased in response to a radar event being detected, although examples are not so limited. In some examples, the priority for a particular channel may be adjusted based on a history of radar events. That is, a number of past detected radar events may be considered when adjusting a priority of the particular channel.

Instructions 106 may further include instructions executable to detect a noise event on a particular channel of the wireless network. As described previously, noise refers to interference that is able to occur on any channel and/or frequency. A noise event may occur on client devices that are able to use DFS channels as well as client devices that are not. Once a noise event is detected, instructions 106 may include instructions executable to adjust a priority of the particular channel. That is, the priority of the particular channel may be changed based on the detected noise events. In some examples, upon detection of a noise event on a particular channel, the priority of the particular channel may be decreased, although examples are not so limited. The priority of the particular channel may be adjusted based on a history of noise events as well. For example, a particular channel with a history of experiencing noise events may be adjusted with reference to both the history of noise events and a detected noise event. That is, a priority of a particular channel may be determined based both on a detected noise event and a number of previous noise events experienced by the particular channel.

Instructions 108 may include instructions executable by processor 102 to receive a set of constraints on a channel plan. As used herein, a constraint refers to a limitation on the channel plan. For example, one constraint may be a number of radios operating on a single wireless channel. Other constraints may include an amount of disruption experienced and an amount of interference experienced, although examples are not so limited.

Instructions 110 may include instructions executable to determine a channel plan. In some examples, the channel plan may be determined based on the channel distribution vector. Moreover, the channel plan may be determined to meet the set of constraints. That is, the channel plan determined by instructions 110 may be a channel plan that meets the constraints received by instructions 108.

Instructions 110 may include instructions to determine a plurality of cost metrics. As described previously, a cost metric a measure of a characteristic of a network and/or a channel plan. The plurality of cost metrics may be determined based on the constraints; that is, a cost metric may be determined for each of the constraints. Moreover, the plurality of cost metrics may be determined based on the channel distribution vector. Said differently, the plurality of cost metrics may be determined for the channel distribution vector determined by instructions 106.

Instructions 110 may further include instructions to map the plurality of radios to the number of available channels. In some examples, the plurality of radios may be mapped to the number of available channel plans based on the channel distribution vector determined by instructions 106. That is, the channel distribution vector may inform the mapping of the plurality of radios to the available channels of the wireless network. For example, as described previously, a channel distribution vector may represent a distribution of wireless channels, and may represent a number of radios on each of the available wireless channels in the network. Instructions 110, thus, may include instructions to distribute the plurality of radios to the number of available channels according to the distribution defined by the channel distribution vector.

In some examples, instructions 110 may include instructions executable to determine an initial channel plan. The initial channel plan may correspond to the channel plan determined by instructions 110 according to the channel distribution vector. Instructions 110 may further include instructions to modify a set of assigned channels. As used herein, to modify a set of assigned channels refers to changing or altering the assigned channels. For instance, a channel may be modified by switching an operating channel of a radio, although examples are not so limited. In some examples, a set of assigned channels may be modified for a subset of radios in the channel plan. That is, assigned channels may be modified for some of the radios in the channel plan, while keeping the assigned channels for the other radios.

Instructions 110 may further include instructions executable to iteratively compute cost metrics for the initial channel plan. As used herein, to iteratively compute cost metrics refers to sequential and repetitious computation of the cost metrics. For example, as described previously, a set of assigned channels may be modified. A cost metric may be computed each time a channel of the set of assigned channels is modified. That is, a cost metric may be computed for each modification of the set of assigned channels. Examples are not so limited, however, and other iterations of the cost metrics may be computed.

Instructions 112, when executed by processor 102, may include instructions to transmit the channel plan to a plurality of radios on the wireless network. The channel plan may be the channel plan determined by instructions 110, and may be the channel plan determined based on the channel distribution vector. In some examples, the channel plan may comprise a channel assigned to each radio of the plurality of radios. That is, the channel plan may include assignments of a channel to each radio of the wireless network. Each radio may have a single channel assigned to it; however, a channel may be assigned to more than one radio of the plurality of radios.

Figure 2:
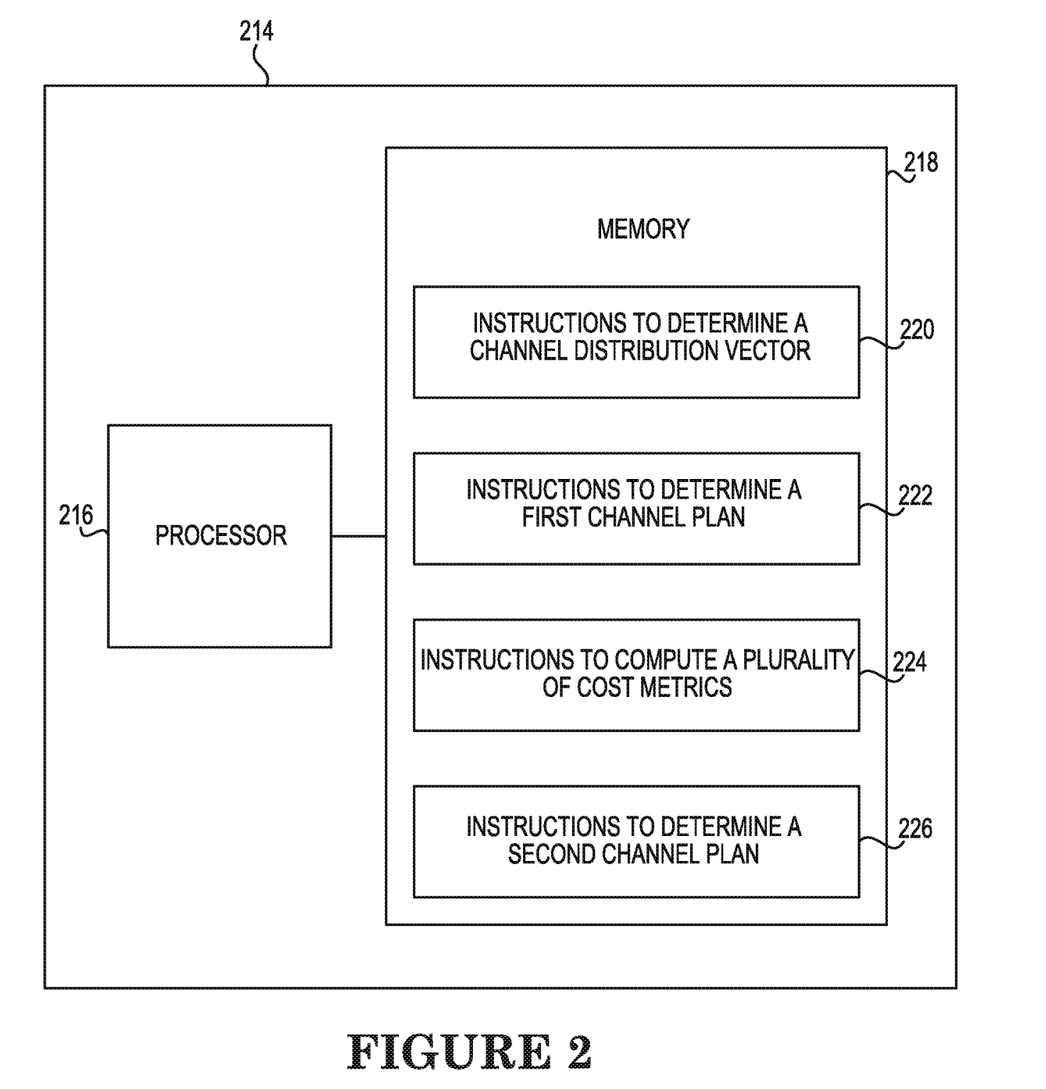
FIG. 2 is example controller to determine channel plans consistent with the present disclosure.

FIG. 2 is an example controller 214 for channel plan distribution consistent with the present disclosure. As used herein, a controller refers to a management device on a computer network. A controller may, for example, manage access points within a wireless local area network (WLAN). Controller 214 may include a processor 216. Processor 216 may be a central processing unit (CPU), a semiconductor based microprocessor, and/or other hardware devices suitable for retrieval and execution of instructions stored in memory 218. Processor 216 may fetch, decode, and execute instructions 220, 222, 224, 226, or a combination thereof. As an alternative or in addition to retrieving and executing instructions, processor 216 may include at least one electronic circuit that includes electronic components for performing the functionality of instructions 220, 222, 224, 226, or a combination thereof.

Memory 218 may be an electronic, magnetic, optical, or other physical storage device that stores executable instructions. Thus memory 218 may be, for example, Random Access Memory (RAM), an Electrically-Erasable Programmable Read-Only Memory (EEPROM), a storage drive, an optical disc, and the like. Memory 218 may be disposed within controller 214, as shown in FIG. 2. In this example, the executable instructions may be "installed" on the network controller. Additionally and/or alternatively, memory 218 may be a portable, external or remote storage medium, for example, that allows controller 214 to download the instructions from the portable/external/remote storage medium. In this situation, the executable instructions may be part of an "installation package". As described herein, memory 218 may be encoded with executable instructions for channel plan determination.

Instructions 220 may include instructions executable by processor 216 to determine a channel distribution vector. As described with respect to FIG. 1, a channel distribution vector refers to a vector representing a distribution of wireless channels and may, in some examples, comprise a histogram representing a number of radios on each of the available wireless channels in the network. The channel distribution vector may be determined for a plurality of channels of a wireless network, and may be determined based on, for example, a number of radios in the wireless network and a number of available wireless channels, although examples are not so limited.

Instructions 222 may include instructions executable by processor 216 to determine a first channel plan. In some examples, the channel plan may be determined by mapping a plurality of radios to the plurality of available channels based on the channel distribution vector. That is, as described with respect to FIG. 1, determination of the channel plan may be informed by the channel distribution vector.

Instructions 224 may include instructions executable by processor 216 to compute a plurality of cost metrics for the first channel plan. As described previously, the plurality of cost metrics may be computed for the first channel plan. The plurality of cost metrics may be computed by instructions 224 in order to refine the first channel plan.

In some examples, instructions 224 may include instructions to compute the plurality of cost metrics in two phases. The first phase may include instructions executable to compute a subset of cost metrics for a threshold number of iterations of the first channel plan. As used herein, an iteration of a first channel plan refers to a channel plan based on the first channel plan. For instance, an iteration of a first channel plan may be a channel plan that resembles the first channel plan but has a difference, such as a particular radio of the channel plan being assigned to a different channel, although examples are not so limited. Each iteration of the first channel plan may have a subset of cost metrics computed for it, up to a threshold number of iterations having cost metrics computed. Said differently, a subset of cost metrics may be computed for a particular threshold number of iterations of the first channel plan. The subset of cost metrics may exclude the channel distribution vector. That is, the threshold number of iterations to have cost metrics computed may have cost metrics other than the channel distribution vector computed in the first phase of computation. In some examples, the computation of the subset of cost metrics for the threshold number of iterations may occur to determine a plurality of candidate channel plans.

The second phase of cost metrics computed by instructions 224 may include instructions to modify a plurality of radios. That is, the second phase of cost metric computation may include changing a plurality of radios. In some examples, modifying a plurality of radios may include altering an operating channel of a radio of the plurality of radios. The plurality of radios may be modified one radio at a time, or by changing one radio of the plurality of radios. Moreover, the plurality of radios may be modified for a number of iterations of the first channel plan. In some examples, the number of iterations may correspond to the plurality of candidate channel plans. That is, a plurality of radios may be modified for the plurality of candidate channel plans determined in the first phase of cost metric computation.

Instructions 226, when executed by processor 216, may include instructions to determine a second channel plan. In some examples, the second channel plan may correspond to the refined first channel plan. That is, the second channel plan may correspond to the channel plan resulting from the computation of the plurality of cost metrics for the first channel plan by instructions 224. In some examples, the first channel plan may be modified using a transportation approach to determine the second channel plan. The transportation approach is discussed further herein with respect to FIG. 3.

Figure 3:
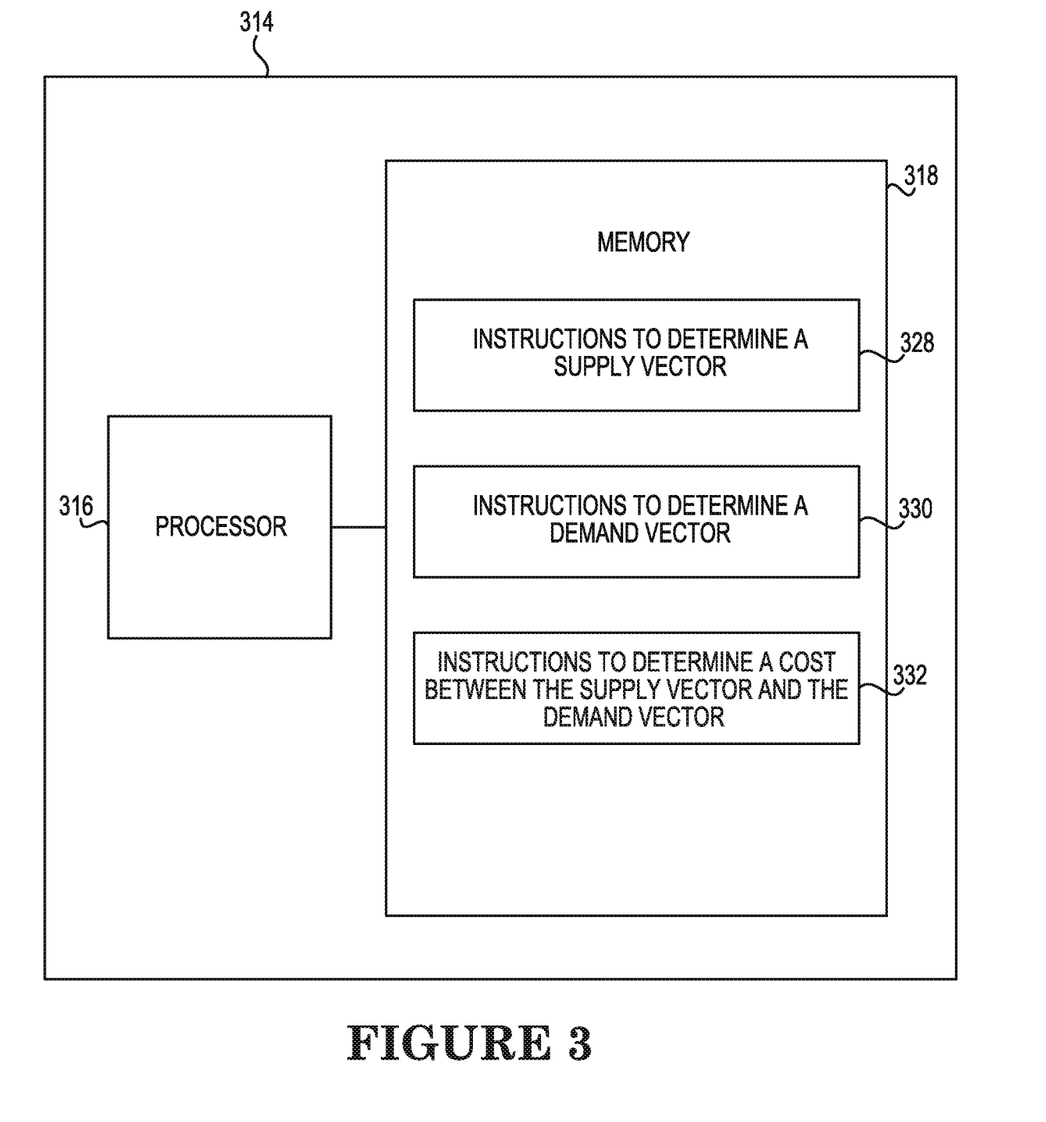
FIG. 3 is another example controller to determine channel plans consistent with the present disclosure.

FIG. 3 is another example controller 314 for channel plan determination consistent with the present disclosure. Controller 314 may include a processor 316. Processor 316 may be akin to processor 216, discussed with respect to FIG. 2. Controller 314 may further include a memory 318. Memory 318 may be akin to memory 218, described with respect to FIG. 2. Memory 218 may be encoded with executable instructions for channel plan determination.

Instructions 328 may include instructions executable by processor 316 to determine a supply vector. As used herein, a supply vector refers to a vector corresponding to an amount of a resource. In the context of a channel plan, the resource represented by the supply vector may be the channel distribution for a first channel plan. That is, the supply vector may correspond to a channel distribution vector for a first channel plan.

Instructions 330, when executed by processor 316, may include instructions to determine a demand vector. As used herein, a demand vector refers to a vector corresponding to a desire for a particular resource. In the context of a channel plan, the demand may correspond to the desire for or amount of network usage. In some examples, the demand vector may correspond to a channel distribution vector. A channel distribution objective may correspond to a desired distribution of channels within a wireless network. For example, a channel distribution may correspond to a particular distribution of radios among channels in a wireless network, although examples are not so limited.

Instructions 332 may include instructions executable by processor 316 to determine a cost between each value of the supply vector and a corresponding value of the demand vector. In some examples, the cost may correspond to a cost to move between two channels. That is, the cost between a value of the supply vector and the corresponding value of the demand vector may represent a cost to move between two operating channels. In some examples, the cost between each value of the supply vector and the corresponding value of the demand vector may be represented in a matrix. The matrix, in turn, may represent the number of radios that may have their operating c channels changed so as to satisfy the channel distribution objective represented by the demand vector. In some examples, the cost, or difference, may be set to zero when a radio is not to change an operating channel, while the cost may be set to a positive integer when a radio is to change to a different operating channel.

For example, a network may include four channels [C1, C2, C3, C4]. A supply vector may be determined to be [5, 1, 1, 5], indicating that 5 radios may be on C1, 1 radio may be on each of C2, and C3, and 5 radios may be on C4. A demand vector may be determined to be [3, 3, 3, 3]. The supply and demand vectors indicate that C1 and C4 are able to give up two radios each, and C2 and C3 are able to pick up 2 radios each. Thus, the solution to move to demand vector [3, 3, 3, 3] may be to move two radios from C1 to C3 and two radios from C4 to C2. Examples are not so limited, however, and any value for a supply vector and demand vector may be used.

Figure 4:
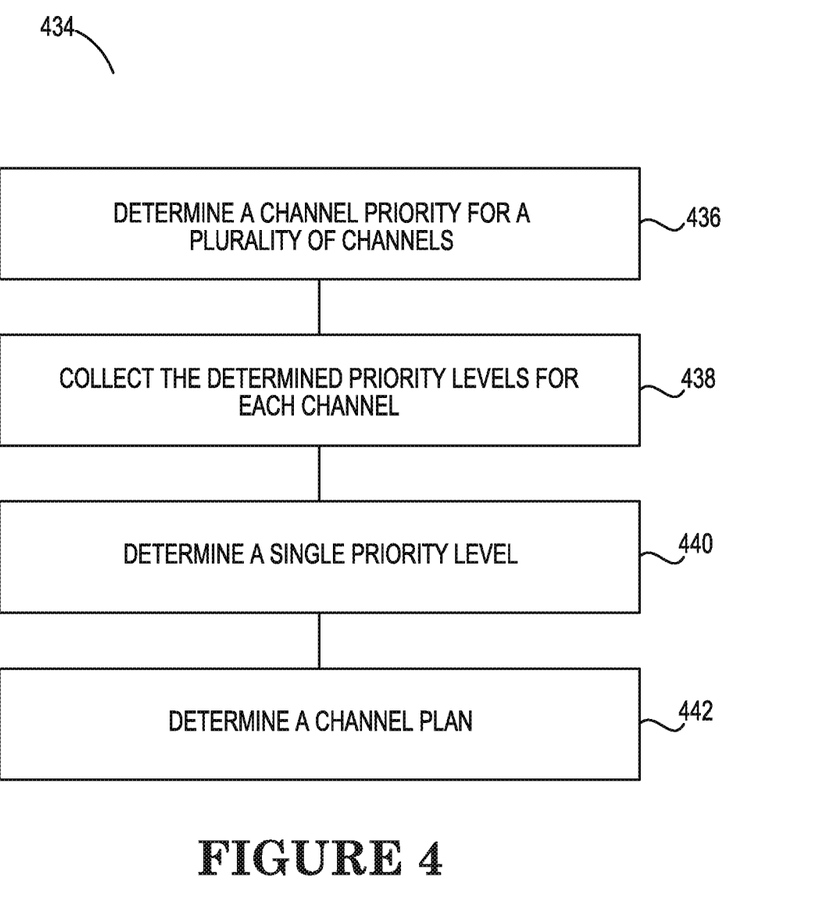
FIG. 4 is an example method to determine channel plans consistent with the present disclosure.

FIG. 4 is an example method 434 for channel plan determination consistent with the present disclosure. At 436, method 434 may include determining, by a network device, a channel priority for a plurality of channels. As described with respect to FIG. 1, a channel priority refers to a preference of the channel within the wireless network. In some examples, determining a channel priority at 436 may include determining a priority level for the plurality of channels at each radio of a plurality of radios of the network. That is, each radio may have a priority level for each channel determined for the particular radio. Thus, a first radio may have a channel priority for a particular channel that is different than the channel priority for the particular channel on a second radio.

In some examples, determining a channel priority for a plurality of channels at 436 may include transmitting the determined priority levels from each of the plurality of radios to a network controller, such as network controller 214, described with respect to FIG. 2, or network controller 314, described with respect to FIG. 3. As described previously, a network controller may serve as a central connection and/or manager between nodes in the wireless network. Thus, the plurality of radios, which may be located on a plurality of access points, may be coupled to a network controller. The network controller may collect the determined priority levels for each channel of the plurality of channels, with the determined priority levels being the priority levels transmitted from each of the plurality of radios.

Determining a channel priority for a plurality of channels at 436 may occur for a group of radios within the network. That is, the channel priority may be determined for a plurality of radios of the network. Alternately, the channel priority may occur for a single radio within the network. In some examples, the channel priority determination may occur at a network level; that is, the channel priority determination may occur for the network as a whole. In other examples, the channel priority determination may occur at the radio level.

At 438, method 434 may include collecting, by the network device, the determined priority levels. As described previously, the determined priority levels may be collected at a network controller, such as controller 214 or 314, discussed with respect to FIGS. 2 and 3, respectively. In some examples, collecting the determined priority levels at 438 may include collecting the determined priority levels for each channel of the plurality of channels. The determined priority levels may be collected at 438 from each radio of the plurality of radios.

At 440, method 434 may include determining, by the network device, a single priority level for each channel of the plurality of channels. The single priority level may be determined based on the collected priority levels. That is, the priority levels determined by each radio of the plurality of radios for a particular channel may become a basis for an overall, network-level channel priority for the particular channel. In some examples, the single channel priority level may be an average of the determined channel priority levels. In other examples, the single channel priority level may be determined to be the most frequent channel priority level of the determined channel priority levels. Examples are not so limited, however, and the single priority level for each channel of the plurality of channels may be determined using other methods. In some examples, the determination of the single priority level for each channel of the plurality of channels may occur at a network level; that is, the single priority level may correspond to a priority level for a channel for the network.

At 442, method 434 may include determining, by the network device, a channel plan. The channel plan may be determined based on the single priority level determined at 440. In some examples, determining a channel plan at 442 may include assigning a plurality of radios the plurality of channels based on the single priority level. For example, a plurality of radios may be assigned to channels of the priority of channels with a greater priority level before being assigned to channels of the priority of channels with a lesser priority level. Examples are not so limited, however, and other bases may be used to determine the channel plan.

Method 434 may further include determining a plurality of channel plans. The plurality of channel plans may be determined for the plurality of channels within the network environment. That is, each channel plan of the plurality of channel plans may be determined for the channels within a network. In some examples, determining a plurality of channel plans may include determining a channel distribution vector. As described previously, a channel distribution vector refers to a vector representing a distribution of wireless channels. The channel distribution vector may be based on the determined channel priority levels for the plurality of channels determined at 440. In some examples, the channel distribution vector may be determined using the channel priority levels, with channels having higher priority levels being given greater weight in the channel distribution vector. Said differently, the channel distribution vector may be determined such that channels with a greater priority level are preferred within the vector. In other examples, the channel distribution vector may be determined using channels with a channel priority level above a threshold. That is, a channel distribution vector may include those channels with a particular channel priority level, and exclude channels that fall below the threshold level. Examples are not so limited, however, and the reference channel distribution vector may be determined based on the determined channel priority levels using other methods.

Method 434 may further include selecting a particular channel plan of the determined channel plans. In some examples, selecting a particular channel plan may comprise determining an initial channel plan. The initial channel plan may then be modified. In some examples, modifying an initial channel plan may include modifying a set of channels for a subset of radios in the initial channel plan. As described with respect to FIG. 2, modifying a set of channels for a subset of radios may involve changing an operating channel of a radio, although examples are not so limited.

Selecting a particular channel plan may further comprise iteratively computing cost metrics for the initial channel plan. As described with respect to FIG. 1, a cost metric may be computed each time a channel of the set of assigned channels is modified. That is, a cost metric may be computed for each modification of the set of assigned channels for the initial channel plans. A channel plan may be selected based on the iteratively computed cost metrics. For example, a channel plan may be selected in response to the iteratively computed cost metrics for the channel plan being above a threshold cost metric value. In some examples, a plurality of channel plans may have a cost metric value below the threshold cost metric value. In such examples, the channel plan with the smallest cost metric value may be selected. That is, the channel plan with the largest difference between computed cost metric value and the threshold cost metric may be selected, although examples are not so limited.

Method 434 may further include refining the particular channel plan. The particular channel plan to be refined may be the channel plan selected based on the iteratively computed cost metrics. In some examples, the particular channel plan may be refined using the transportation approach described with respect to FIG. 3. Method 434 may further include transmitting the refined channel plan. The refined channel plan may be transmitted to the plurality of radios of the network environment. Upon transmission of the refined channel plan to the plurality of radios, or nodes, of the network, the plurality of radios may implement the refined channel plan. In some examples, implementing the refined channel plan may include moving a radio, or a plurality of radios, to a different channel within the wireless network, based on the channel plan. That is, a radio may change its operating channel when the refined channel plan has assigned the radio to a different operating channel.

In the foregoing detail description of the present disclosure, reference is made to the accompanying drawings that form a part hereof, and in which is shown by way of illustration how examples of the disclosure may be practiced. These examples are described in sufficient detail to enable those of ordinary skill in the art to practice the examples of this disclosure, and it is to be understood that other examples may be utilized and that structural changes may be made without departing from the scope of the present disclosure.

The figures herein follow a numbering convention in which the first digit corresponds to the drawing figure number and the remaining digits identify an element or component in the drawing. Elements shown in the various figures herein can be added, exchanged, and/or eliminated so as to provide a number of additional examples of the present disclosure. In addition, the proportion and the relative scale of the elements provided in the figures are intended to illustrate the examples of the present disclosure, and should not be taken in a limiting sense. Further, as used herein, "a number of" an element and/or feature can refer to any number of such elements and/or features.

What is claimed:

1. A method, comprising:

determining, by a network device, an initial channel priority for each of a plurality of channels, wherein the plurality of channels comprise a first channel with a first initial channel priority and a second channel with a second initial channel priority, wherein the initial channel priority for each of the plurality of channels are generated according to a channel distribution vector within a network environment, and wherein the channel distribution vector is referring to a preference of each of the plurality of channels within the network environment;

determining a subset of channels where the initial channel priority for each of the plurality of channels are removed from the subset of channels when the initial channel priority falls below a threshold level;

determining, by the network device a single, overall network-level channel priority level for the subset of channels across all of a plurality of radios at a network level; and determining, by the network device, a channel plan based on the single, overall network-level channel priority level.

2. The method of claim 1, wherein determining the initial channel priority for the plurality of channels occurs for a group of radios within the network environment or for a particular radio of the plurality of radios within the network environment.

3. The method of claim 1, wherein determining the initial channel priority for the plurality of channels occurs at the network level or at a radio level.

4. The method of claim 1, wherein determining the initial channel priority for the plurality of channels further comprises:

transmitting the determined priority levels from each of the plurality of radios to a network controller.

5. The method of claim 1, further comprising:

determining a plurality of channel plans based on the channel distribution vector;

selecting a particular channel plan of the plurality of channel plans;

refining the particular channel plan; and transmitting the refined channel plan to the network environment.

6. The method of claim 4, wherein selecting a particular channel plan of the plurality of channel plans further comprises:

determining an initial channel plan;

modifying a set of assigned channel plans of the first channel plan for a subset of radios in the initial channel plan;

iteratively computing cost metrics for the initial channel plan; and selecting a channel plan based on the iteratively computed cost metrics.

7. The method of claim 1, wherein the overall network-level channel priority for each channel comprises an average of the determined channel priorities for each of the plurality of channels.

8. The method of claim 1, wherein the overall network-level channel priority for each channel corresponds to a most frequent channel priority level of the determined channel priorities for each of the plurality of channels.

9. The method of claim 1, wherein the channel plan is a first channel plan and the method is further comprising:

refining the first channel plan to generate a second channel plan.

10. The method of claim 9, further comprising:

determining a supply vector corresponding to the first channel plan;

determine a demand vector corresponding to a channel distribution objective; and determine a cost between each value of the supply vector and a corresponding value of the demand vector, wherein the cost corresponds to a cost to move between the first channel plan and the second channel plan.

* * * * *